United States Patent [19]

Huitema

[11] 4,215,771

[45] Aug. 5, 1980

[54] SINGLE LEVER CONTROL SYSTEM

[75] Inventor: Thomas W. Huitema, Racine, Wis.

[73] Assignee: J. I. Case Company, Racine, Wis.

[21] Appl. No.: 884,647

[22] Filed: Mar. 8, 1978

[51] Int. Cl.[2] .................... G05G 9/08; B60K 41/22; B60K 41/28

[52] U.S. Cl. .................... 192/3.54; 74/471 R; 74/872; 192/0.092

[58] Field of Search .................... 192/0.092, 3.54, 3.55, 192/3.56, 3.57, 3.58, 3.59; 74/471 R, 872, 874, 877

[56] References Cited

U.S. PATENT DOCUMENTS

| | | | |
|---|---|---|---|
| 691,968 | 1/1902 | Paine | 74/471 R |
| 1,436,422 | 11/1922 | Wiles | 74/874 X |
| 1,667,842 | 5/1928 | Coykendall | 74/471 R |
| 2,031,807 | 2/1936 | Werner | 192/0.092 X |
| 2,691,080 | 10/1954 | Kellogg | 74/471 R X |
| 3,469,472 | 9/1969 | Bislew | 74/761 |
| 3,541,876 | 11/1970 | Gressard | 74/471 R |
| 3,687,248 | 8/1972 | Holub | 192/3.54 |
| 4,048,869 | 9/1977 | Johnson | 74/471 R |

*Primary Examiner*—Allan D. Herrmann

*Attorney, Agent, or Firm*—Dressler, Goldsmith, Shore, Sutker & Milnamow, Ltd.

[57] ABSTRACT

A control system for simultaneously controlling a plurality of fluid operated devices with a single control lever is disclosed herein. The control lever is pivoted about a fixed axis to a plurality of distinct positions and has a plurality of camming surfaces with linkage means between each camming surface and an associated control device. The camming surfaces are configured so that only one or both of the control devices are shifted in response to pivotal movement of the control lever from one distinct position to another and the control devices are alternatively shifted as the control lever is moved through the plurality of distinct positions.

1 Claim, 5 Drawing Figures

24
80
82
42
82
80
82
84
22
80
86
128
110
6TH
5TH
4TH
3RD
2ND
1ST
R
26
R3
4
100
R1
R2
74
P
4
56
54
60
50
40
58
52
72
70
76
68
44

22
102
106
110
100
104

24
42
22
84
80
130
82
128
86
26
126

100
50
40
72
52

SINGLE LEVER CONTROL SYSTEM

BACKGROUND OF THE INVENTION

The present invention relates generally to control systems and more particularly to a control lever for simultaneously controlling the movement of at least a pair of control devices.

Most present day commercial industrial vehicles require controlling a number of control elements to perform various functions during normal use of the vehicle. For example, agricultural equipment such as large heavy duty tractors normally incorporate multi-speed transmissions so that the vehicle can be operated throughout a wide range of speed for different functions. One example of such a transmission is disclosed in Bislew U.S. Pat. No. 3,469,472. The transmission disclosed therein consists of two different units that are operatively interconnected so that the vehicle can be operated in as many as twelve different speeds in the forward direction and four speeds in the reverse direction.

To further increase the versatility of such a suit, the transmission also has a range control so that the transmission can be operated at two different ranges, such as direct drive and under drive, for each given speed of the transmission.

Such a combination of control elements require the numerous control levers for controlling the respective elements at selected times. Of course, numerous control systems have been proposed which are capable of operating more than one control element. For example, U.S. Pat. Nos. 3,541,876 and 2,691,080 disclose single control levers for simultaneously controlling at least two different control elements.

Another example of a single control lever is U.S. Pat. No. 4,048,869 which discloses a single control lever for simultaneously controlling two elements and the subject patent is assigned to the assignee of the present invention.

While there are numerous existing control systems wherein a single control lever simultaneously controls a plurality of movable elements, manufacturers of agricultural and industrial equipment are constantly striving for producing a more competitive unit from a cost standpoint without sacrificing operating performance.

SUMMARY OF THE INVENTION

According to the present invention, there is provided a unique shifting mechanism which is capable of shifting at least two control elements between a plurality of positions by movement of a single control lever along a predetermined fixed path.

More specifically, the shifting mechanism or control system of the present invention includes a single control lever that is pivoted about a fixed axis on a support and is movable to a plurality of distinct positions. The control lever has at least two camming surfaces defined thereon with linkage means between each of the camming surfaces and an associated control element. The camming surfaces are configured so that only one or both of the control elements is shifted in response to pivotal movement of the control lever from one distinct position to another.

In its specific embodiment, one of the camming surfaces has alternating chordal and arcuate portions that are spaced a predetermined distance from the fixed axis for the control lever and a mechanical linkage is interposed between the camming surface and a control element. The chordal and arcuate portions are configured so that movement of the control lever from one distinct position to a second distinct position will cause a shifting of the control element, such as a valve spool, from one position to a second position while movement of the control lever from a second distinct position to a third distinct position will allow the control element or valve spool to remain in the first operative position. In the illustrated embodiment, the second camming surface has a generally sinusoidal configuration to produce raised portions between recessed areas on the peripheral surface of the control member and the linkage consists of a switch that has an actuator based towards the camming surface. The second camming surface is configured so that a solenoid connected to a control valve is energized when the switch actuator is depressed. More specifically, when the actuator of the switch is in its outermost or extended position, the solenoid is deenergized which occurs when the actuator is in alignment with a recess of the camming surface and the solenoid is energized when the actuator is depressed which occurs when the actuator is aligned with a raised portion of the camming surface. The raised and recessed portions of the camming surface are correlated with the chordal and arcuate portions of the first camming surface so that the respective control elements are sequentially shifted as the control lever is moved through the plurality of distinct positions.

In the specific embodiment of the invention to be disclosed and described, the control elements are valve spools that form part of a transmission control unit which also includes a clutch which has two positions that respectively define the neutral and engaged position for the transmission unit. The control system also incorporates means for automatically moving the control lever to a lowermost forward speed for the transmission whenever the clutch is moved to the neutral position.

DETAILED DESCRIPTION

Figure 1:
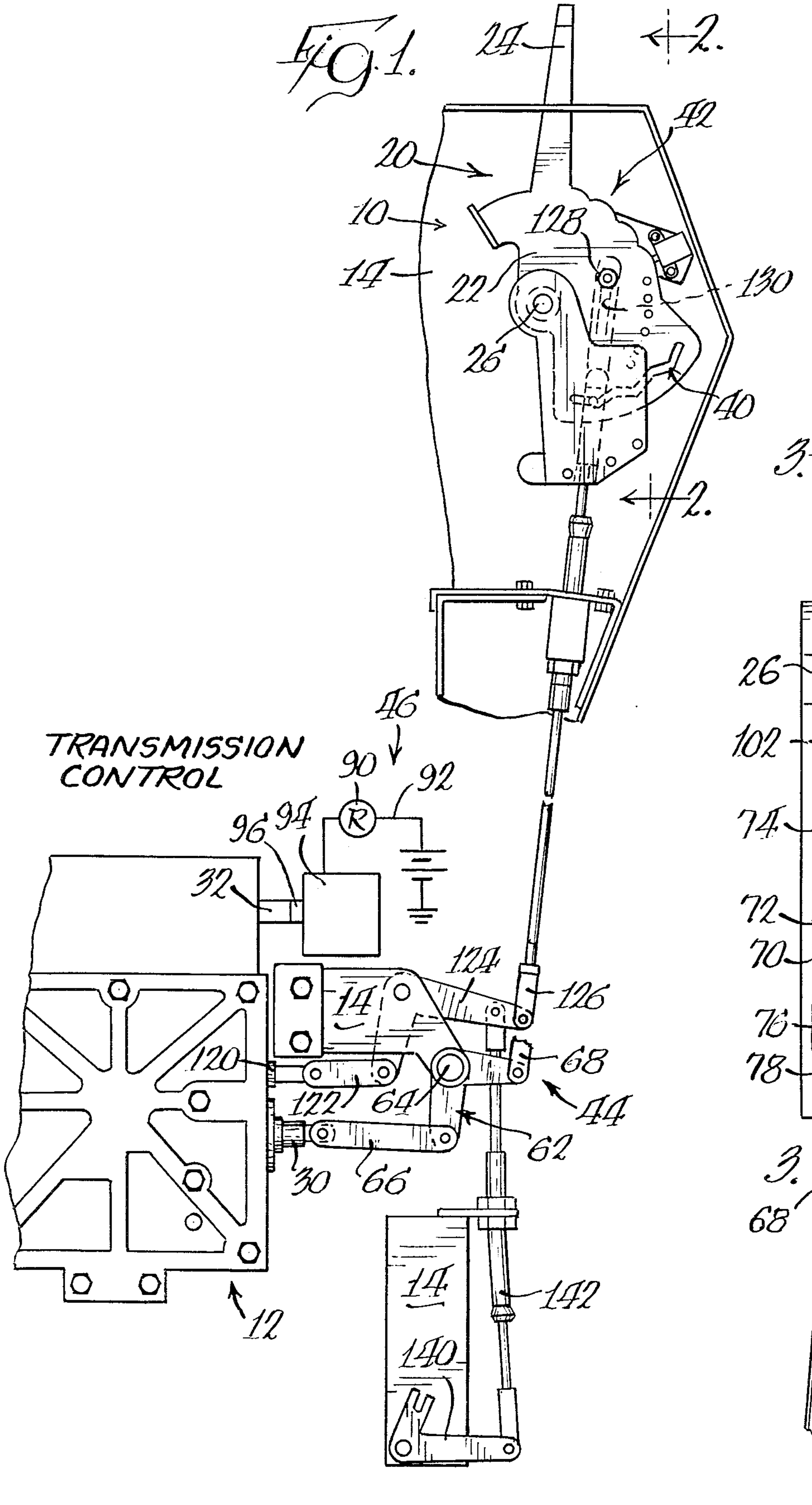
FIG. 1 is a fragmentary plan view of a transmission control unit with the control system of the present invention associated therewith.

While this invention is susceptible of embodiment in many different forms, there is shown in the drawings and will herein be described in detail a preferred embodiment of the invention with the understanding that the present disclosure is to be considered as an exemplification of the principles of the invention and is not intended to limit the invention to the embodiment illustrated.

FIG. 1 of the drawings discloses a control system, generally designated by reference numeral 10, which controls various elements that form part of a transmission control unit, generally designated by reference numeral 12. Control system 10 is supported on a frame or support 14 which forms part of a vehicle (not shown) such as an agricultural tractor. Control system 10 includes a control lever 20 consisting of a quadrant or body 22 and a handle 24 which is positioned to be accessable by the operator when he is seated on the tractor. Control lever 20, more specifically, quadrant or body 22 is pivoted about a fixed axis on support 14 through a pivot pin 26 and is movable between a plurality of distinct position, seven of which have been illustrated in the drawings, as will be described in more detail later.

For purposes of illustration, transmission control unit 12 has been illustrated as including a first control element or valve spool 30 that is movable between a plurality of shifted positions and four such positions have been illustrated which could be reverse and three forward varying speeds for the transmission unit. A second valve spool 32 also forms part of transmission control unit 12 and is a two position valve which respectively conditions the transmission unit for operating at two different ranges for each speed position of control valve 30. By way of example, valve spool 32 could have one position where in the transmission is conditioned for direct drive and a second position wherein the transmission is conditioned for underdrive or a lower speed.

According to the present invention, control lever 20 has a first camming surface 40 defined thereon and a second camming surface 42 with a first linkage 44 between camming surface 40 and valve spool 30 and a second linkage 46 between camming surface 42 and valve spool 32. In the drawings, linkage 44 has been illustrated as a mechanical linkage while linkage 46 has been illustrated as an electrical linkage.

Figure 3:
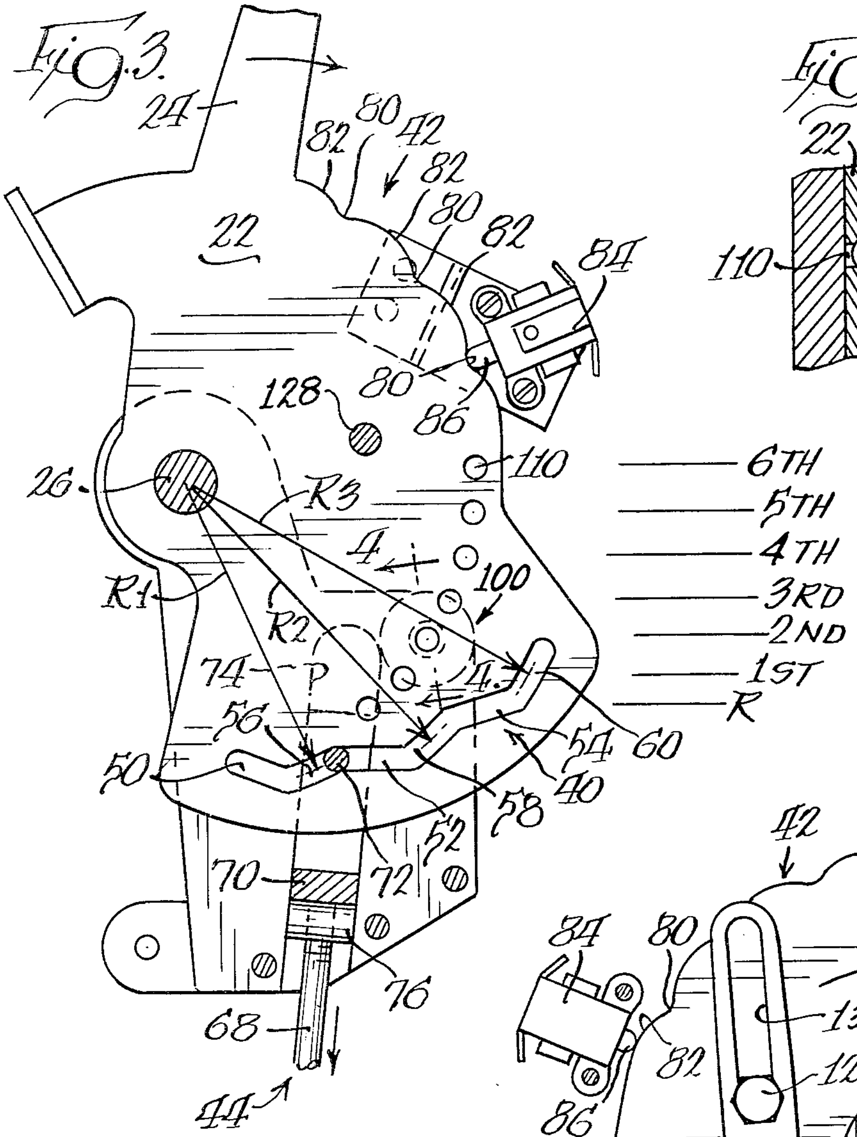
FIG. 3 is a fragmentary sectional view, as viewed along line 3—3 of FIG. 2.

According to the present invention, camming surfaces 40 and 42 are configured and interrelated in a manner that movement of the control lever from a first distinct position to an adjacent distinct position will move only one or both of the two control elements while subsequent movement of the control lever to a further distinct position will move the second control element while the first control element remains stationary. For this purpose, camming surface 40 (FIG. 3) has alternating chordal or linear portions 50, 52 and 54 and arcuate portions 56, 58 and 60 interposed between the linear portions. As more clearly illustrated in FIG. 3, arcuate portions 56, 58 and 60 have different radii R1, R2 and R3 with respect to the fixed pivot axis 26 while chordal portions 50, 52 and 54 have opposite ends spaced different dimensions from the center of pivot axis 26.

Linkage means 44, which defines a first means between camming surface 40 and valve spool or control element 30, is illustratively shown as including a bell crank 62 pivoted on a pin 64 that forms part of frame or support 14 and one arm of bell crank 62 is connected by a link 66 to the end of valve spool 30. The other arm of the bell crank is connected by an adjustable link 68 to a cam follower 70. Cam follower 70 has a pin 72 received into the elongated slot that defines first camming surface 40 and cam follower 70 is guided in a slot 74 that is formed in the body of control member 20. To assure unrestricted movement between cam follower 70 and adjustable link 68 the upper end of adjustable link 68 is connected by a pin 76 which is rotatable in an opening 78 (FIG. 2) to produce a pivotable connection.

A second camming surface 42 (FIG. 3) is defined on the periphery of body 22 of control lever 20 and includes recessed areas 80 all of which are a fixed distance from pivot axis 26 and raised portions 82 interposed between adjacent pairs of recessed areas 80.

Linkage 46 includes a switch 84 that has an actuator 86 which is biased into engagement with camming surface 42 through a spring (now shown). Electrical switch 84 is connected to a relay 90 that is interposed in an electric circuit 92 which leads to a solenoid valve 94. Solenoid valve 94 has a plunger 96 which is normally spring biased outwardly and is connected to the end of valve spool 32 through any type of suitable connection.

Figure 5:
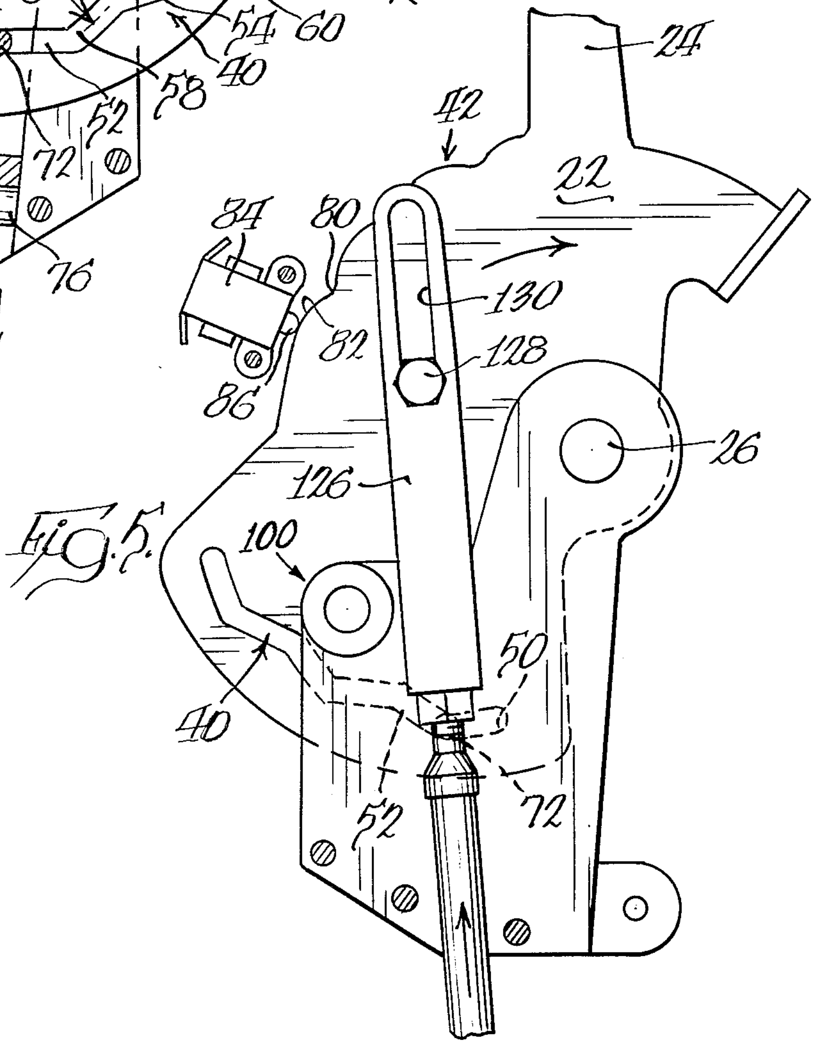
FIG. 5 is a view taken along line 5—5 of FIG. 2.

Considering now the operation of the control system so far described, assuming the control lever is in the position illustrated in FIG. 5 wherein pin 72 is located at the juncture between linear slot portion 50 and arcuate slot portion 52 while switch actuator 86 is depressed. This position corresponds to the first forward speed for transmission unit 12 in which valve spool 30 is in a first forward position while switch actuator 86 is along a raised portion 82 of camming surface 42. In this position, relay 90 is closed to energize solenoid 94 and retract plunger 96 to move transmission control spool 32 to a first position which corresponds to an underdrive for transmission control unit 12. Movement of the control lever in a counterclockwise direction in FIG. 5 from the first position will cause pin 72 to move along arcuate slot portion 52 which is configured so that pin 72 can move the entire length of slot portion 52 while bell crank 62 remains stationary. During such movement, switch actuator 86 is moved from a raised portion 82 into a recessed portion 80 of camming surface 42 which will open relay 90 and thereby deenergize solenoid 94 so that the spring (not shown) associated with plunger 96 will move the plunger out and thereby move control valve spool 32 to a second position (FIG. 3) which corresponds to direct drive for the transmission. This will condition the transmission for a second forward speed illustrated in FIG. 3. Continued movement of the control lever 20 to a further position wherein pin 72 is moved along chordal portion 52 of slot 40 to the juncture between portions 52 and 58 will move valve spool 30 to a second position which corresponds to third gear for the transmission control unit 12. In this position, actuator 86 of switch 84 will be aligned with raised portion 82 of cam surface 42 so that solenoid 94 is again energized. Fourth gear is obtained by moving control lever 20 to a position where actuator 86 is aligned with recessed portion 80 of camming surface 42 to again deenergize solenoid 94.

Thus, it can be seen that the control mechanism is capable of operating two different control elements alternatively as the control lever is moved between a plurality of distinct positions. This is accomplished without any undue manipulation of control lever 20 since it is only necessary to move the lever along a fixed arcuate path with respect to pivot axis 26. Of course, it will be appreciated that the particular configuration of slot portions 50–60 of camming surface 40 could take a variety of forms and the configuration will be dependent upon the relative position of bell crank 62 with respect to pin 72. In summary, the configuration of the respective portions of the slots 50–60 must be such that in the first portion 50 of the slot bell crank moves, while in an adjacent portion of slot 40, the bell crank remains stationary. The configuration of camming surface 42 could also be angular or other configurations than the sinusoidal configuration illustrated.

Of course, any number of control elements could simultaneously be controlled by the single control lever by providing a different number of camming surfaces in addition to camming surfaces 40 and 42 and configuring these camming surfaces such that a control element is moved at the desired time. Also, while the specific embodiment illustrated has been shown as alternately shifting control elements 30 and 32 as control lever is moved from each distinct position to another, camming surfaces 40 and 42 could be configured so that neither control element 30 or 32 or both control elements would be moved as control lever 20 is moved from one distinct position to another.

Figure 2:
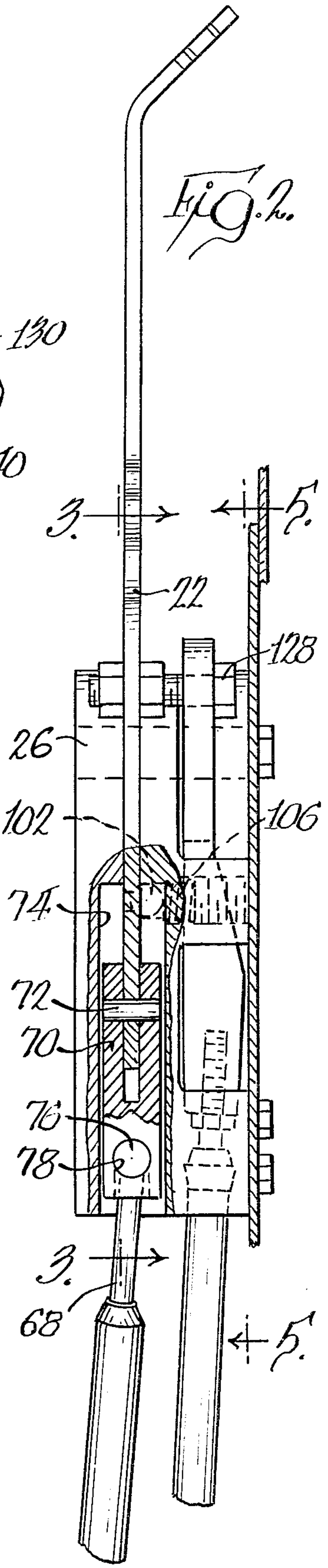
FIG. 2 is an end view, partly in section, as viewed generally along line 2—2 of FIG. 1.
Figure 4:
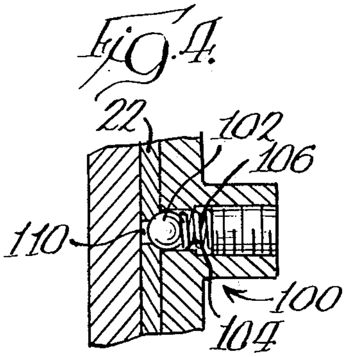
FIG. 4 is a fragmentary sectional view, as viewed along line 4—4 of FIG. 3.

According to another aspect of the invention, the distinct positions for control of the lever 20 are positively defined by detent means 100 that is illustrated in detail in FIGS. 2 and 4. Detent means 100 consists of a spring ball 102 which is received in an opening 104 and is spring biased by a spring 106. The opening is defined in a surface of support 14 which is adjacent the surface of body 22 of control lever 20. Body 22 of control lever 20 has a plurality of openings or recesses 110 which are located along an arcuate path which is aligned with the center of opening 104. The respective recesses or openings 110, seven being illustrated, respectively correspond to the seven gears illustrated in FIG. 3 of the drawing.

According to another aspect of the invention, the transmission control unit 12 also incorporates a clutch which can be moved between engaged and disengaged positions for moving the transmission control unit from an operative to a neutral position and the control system incorporates mechanism which automatically moves control lever 20 to the lowest forward speed when the transmission is moved to a neutral position. This arrangement prevents an operator from inadvertently having the vehicle in a high gear when the clutch is engaged. As illustrated in FIG. 1, the clutch consists of a movable valve spool 120 which is connected by a link 122 to one arm of a bell crank 124 that is pivoted on support 14. The opposite arm of bell crank is connected through an adjustable link 126 to body 22 of control lever 20. This connection includes a bolt 128 that is received into an elongated slot 130 at the upper end of adjustable link 126.

As most clearly shown in FIG. 5, bolt 128 is offset from pivot axis or fixed axis 26 and slot 130 is dimensioned so that bolt 128 will be in an intermediate portion of slot 130 when clutch spool 120 is in an engaged position illustrated in FIG. 1. Clutch spool 120 is moved from an engaged to a disengaged position through a manual control member (not shown) such as the foot pedal which is operatively connected to a bell crank member 140 that is pivoted on support or frame 14. Bell crank member 140 is connected through an adjustable link 142 to the arm of bell crank 124 which has adjustable link 126 connected thereto. Clutch spool 120 is moved outwardly to a disengaged position by pivoting bell cranks 140 and 124 in a counterclockwise direction as viewed in FIG. 1. As bell crank 124 is pivoted counterclockwise, bolt 128 will move along slot 130 and will ultimately engage the lower end of slot, as illustrated in FIG. 5 and will automatically cause control lever 20 to pivot clockwise about pin 26 to move the control lever to the position illustrated in FIG. 5 wherein the transmission control unit 12 is conditioned for forward operation in the first gear.

As can be appreciated from the above description, the control unit of the present invention provides a unique and extremely simple construction for simultaneously operating a plurality of control devices through the use of a single control lever. The utilization of one electrical linkage rather than a mechanical linkage simplifies the operative connection between the control lever and the control element.

Summarizing the present invention, the unique control system is capable of simultaneously controlling any number of control elements through the movement of a single control lever by proper selection of camming surfaces on the control lever and configuring the surfaces to produce movement of a selected control element at any portion of the complete range of movement of the control lever.

What is claimed is:

1. A control system for simultaneously controlling movement of a plurality of control elements forming part of a transmission control through movement of a single control lever, which transmission includes a manually operated clutch engageable and disengageable to control said transmission, a support, a control lever supported on a fixed axis on said support and pivotable to a plurality of distinct positions, an operative connection between said clutch and said control lever for moving said control lever to a position corresponding to the lowest forward speed when said clutch is moved to a disengaged position, said control lever having at least first and second camming surfaces, first means between said first camming surface and a first of said control elements for causing shifting of said first control element in response to pivotal movement of said control lever, second means between said second camming surface and a second of said control elements for causing shifting of said second control elements in response to pivotal movement of said control lever, said camming surfaces being configured so that only one or both of said first and second control elements is shifted in response to pivotal movement of said control lever from one distinct position to another distinct position.

* * * * *